(12) United States Patent
Chen et al.

(10) Patent No.: US 7,360,558 B1
(45) Date of Patent: Apr. 22, 2008

(54) CONTROL VALVE FOR DRINKING WATER FOUNTAIN

(76) Inventors: Jui-Chien Chen, 321, Sec. 4, Lu He Rd., Lu Gang, Changhua Hsien (TW); Jui-Ching Chen, 321, Sec. 4, Lu He Rd., Lu Gang, Changhua Hsien (TW)

( * ) Notice: Subject to any disclaimer, the term of this patent is extended or adjusted under 35 U.S.C. 154(b) by 182 days.

(21) Appl. No.: 11/141,073

(22) Filed: May 31, 2005

(51) Int. Cl.
*F16K 21/00* (2006.01)

(52) U.S. Cl. .................... 137/801; 137/315.13

(58) Field of Classification Search ......... 137/801, 137/315.12, 315.13, 315.14, 315.15; 251/153, 251/360–363, 366, 321–322; 4/620
See application file for complete search history.

(56) References Cited

U.S. PATENT DOCUMENTS

| | | | | |
|---|---|---|---|---|
| 283,660 A * | 8/1883 | Reed | .................... | 251/221 |
| 929,571 A * | 7/1909 | Dubied | .................... | 251/284 |
| 1,719,316 A * | 7/1929 | Appleton | ............... | 137/327 |
| 4,236,482 A * | 12/1980 | Gingerich et al. | .......... | 118/642 |
| 4,454,891 A * | 6/1984 | Dreibelbis et al. | .......... | 137/216 |
| 4,676,482 A * | 6/1987 | Reece et al. | ............. | 251/365 |
| 5,975,140 A | 11/1999 | Lin | ..................... | 137/801 |

* cited by examiner

*Primary Examiner*—Ramesh Kirshnamurthy
*Assistant Examiner*—Craig Schneider
(74) *Attorney, Agent, or Firm*—Alan Kamrath; Kamrath & Associates PA (57) ABSTRACT

A control valve for a drinking water fountain includes a valve housing having an inside formed with a receiving chamber, and a valve seat mounted in the receiving chamber of the valve housing. The valve seat is forced into the receiving chamber of the valve housing by a rib and groove engagement so that the valve seat is secured in the receiving chamber of the valve housing. Thus, the valve seat is forced into the receiving chamber of the valve housing by a rib and groove engagement so that the valve seat is closely secured in the receiving chamber of the valve housing and cannot be rotated relative to the valve housing.

8 Claims, 8 Drawing Sheets

CONTROL VALVE FOR DRINKING WATER FOUNTAIN

BACKGROUND OF THE INVENTION

1. Field of the Invention

The present invention relates to a control valve, and more particularly to a control valve for a drinking water fountain.

2. Description of the Related Art

A conventional drinking water fountain comprises a control valve having a water inlet pipe connected to a water filtering device, and a water outlet pipe connected to the water inlet pipe to inject a water flow from the water inlet pipe outward for use with a user.

The closest prior art reference of a conventional control valve of a drinking water fountain was disclosed in U.S. Pat. No. 5,975,140 and comprises a valve housing 1, and a valve seat 2 mounted in the valve housing 1. The valve housing 1 is formed by a press casting process, and the valve seat 2 is formed by a turning process. The valve seat 2 is directly forced into the valve housing 1 in a close fit manner. However, when the valve seat 2 is forced into the valve housing 1, a greater tolerance is defined between the valve seat 2 and the valve housing 1, thereby forming a gap therebetween so that the control valve easily produces vibration during operation.

SUMMARY OF THE INVENTION

In accordance with the present invention, there is provided a control valve, comprising a valve housing having an inside formed with a receiving chamber, and a valve seat mounted in the receiving chamber of the valve housing. The valve seat is forced into the receiving chamber of the valve housing by a rib and groove engagement so that the valve seat is secured in the receiving chamber of the valve housing.

The primary objective of the present invention is to provide a control valve having a rigid and stable structure.

Another objective of the present invention is to provide a control valve for a drinking water fountain, wherein the valve seat is forced into the receiving chamber of the valve housing by a rib and groove engagement so that the valve seat is closely secured in the receiving chamber of the valve housing and cannot be rotated relative to the valve housing.

A further objective of the present invention is to provide a control valve for a drinking water fountain, wherein the valve seat is combined with of the valve housing rigidly and stably to prevent the valve seat and the valve housing from producing vibration during operation, thereby facilitating a user operating the control valve.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a control valve for a drinking water fountain in accordance with the preferred embodiment of the present invention comprises a water inlet pipe 30, a locking ring 40, a control switch 50, a valve seat 60, a valve housing 70, a water outlet pipe 80, and a handle 90.

The valve housing 70 has an inside formed with a receiving chamber 71. The valve housing 70 has an open first end formed with an inner threaded portion 73 and a closed second end formed with a threaded locking hole 74 and an insertion hole 75 each connected to the receiving chamber 71.

The valve seat 60 is a substantially cylindrical body formed by a plastic injection molding process. The valve seat 60 is mounted in the receiving chamber 71 of the valve housing 70 and has a central portion formed with a valve chamber 61 having a first end formed with a stepped hole 62 for mounting an O-ring 52 and a second end connected to the locking hole 74 of the valve housing 70. The valve seat 60 has a side formed with a water outlet port 63 connected to the valve chamber 61 and the insertion hole 75 of the valve housing 70.

The locking ring 40 is secured on the first end of the valve housing 70 and rested on the valve seat 60 to retain the valve seat 60 in the receiving chamber 71 of the valve housing 70. The locking ring 40 has a periphery formed with an outer threaded portion 41 screwed into the inner threaded portion 73 of the valve housing 70 and an inside formed with a threaded locking hole 42.

The water inlet pipe 30 is extended through the locking ring 40 and connected to the valve chamber 61 of the valve seat 60. The water inlet pipe 30 has a periphery formed with an outer threaded portion 32 screwed into the locking hole 42 of the locking ring 40 and has a first end rested on the O-ring 52 and a second end connected to a water filtering device (not shown).

The water outlet pipe 80 is mounted on the valve housing 70 and connected to the valve seat 60. The water outlet pipe 80 has a lower end inserted into the insertion hole 75 of the valve housing 70 and the water outlet port 63 of the valve seat 60 so that the water outlet pipe 80 is connected to the water outlet port 63 of the valve seat 60.

The control switch 50 is mounted between the valve housing 70 and the valve seat 60 and includes a water control member 54 mounted in the valve chamber 61 of the valve seat 60 and having an upper end protruding outward from the valve housing 70, and a locking nut 51 screwed into the locking hole 74 of the valve housing 70 and rested on the water control member 54 to retain the water control member 54 in the valve chamber 61 of the valve seat 60.

The handle 90 is mounted on the valve housing 70 and connected to the control switch 50 to control operation of the control switch 50. The handle 90 is pivotally mounted on the protruding upper end of the water control member 54 of the control switch 50 and rested on the valve housing 70 to control movement of the water control member 54 of the control switch 50.

In operation, the water from the water inlet pipe 30 in turn flows through the valve chamber 61 of the valve seat 60, the water outlet port 63 of the valve seat 60 and the water outlet pipe 80 and is injected outward from the water outlet pipe 80 for use with a user. At this time, the control switch 50 is operated by the handle 90 to open or close connection between the water inlet pipe 30 and the water outlet pipe 80.

In the preferred embodiment of the present invention, the valve seat 60 is forced into the receiving chamber 71 of the valve housing 70 by a rib and groove engagement so that the valve seat 60 is closely secured in the receiving chamber 71 of the valve housing 70 and cannot be rotated relative to the valve housing 70. Preferably, the receiving chamber 71 of the valve housing 70 has a periphery formed with a plurality of longitudinally extended arc-shaped locking grooves 72 arranged in a symmetrical manner, and the valve seat 60 has a periphery formed with a plurality of longitudinally extended arc-shaped locking ribs 64 arranged in a symmetrical manner and locked in the locking grooves 72 of the valve housing 70 respectively.

Accordingly, the valve seat 60 is forced into the receiving chamber 71 of the valve housing 70 by a rib and groove engagement so that the valve seat 60 is closely secured in the receiving chamber 71 of the valve housing 70 and cannot be rotated relative to the valve housing 70. In addition, the valve seat 60 is combined with of the valve housing 70 rigidly and stably to prevent the valve seat 60 and the valve housing 70 from producing vibration during operation, thereby facilitating a user operating the control valve.

Figure 1:
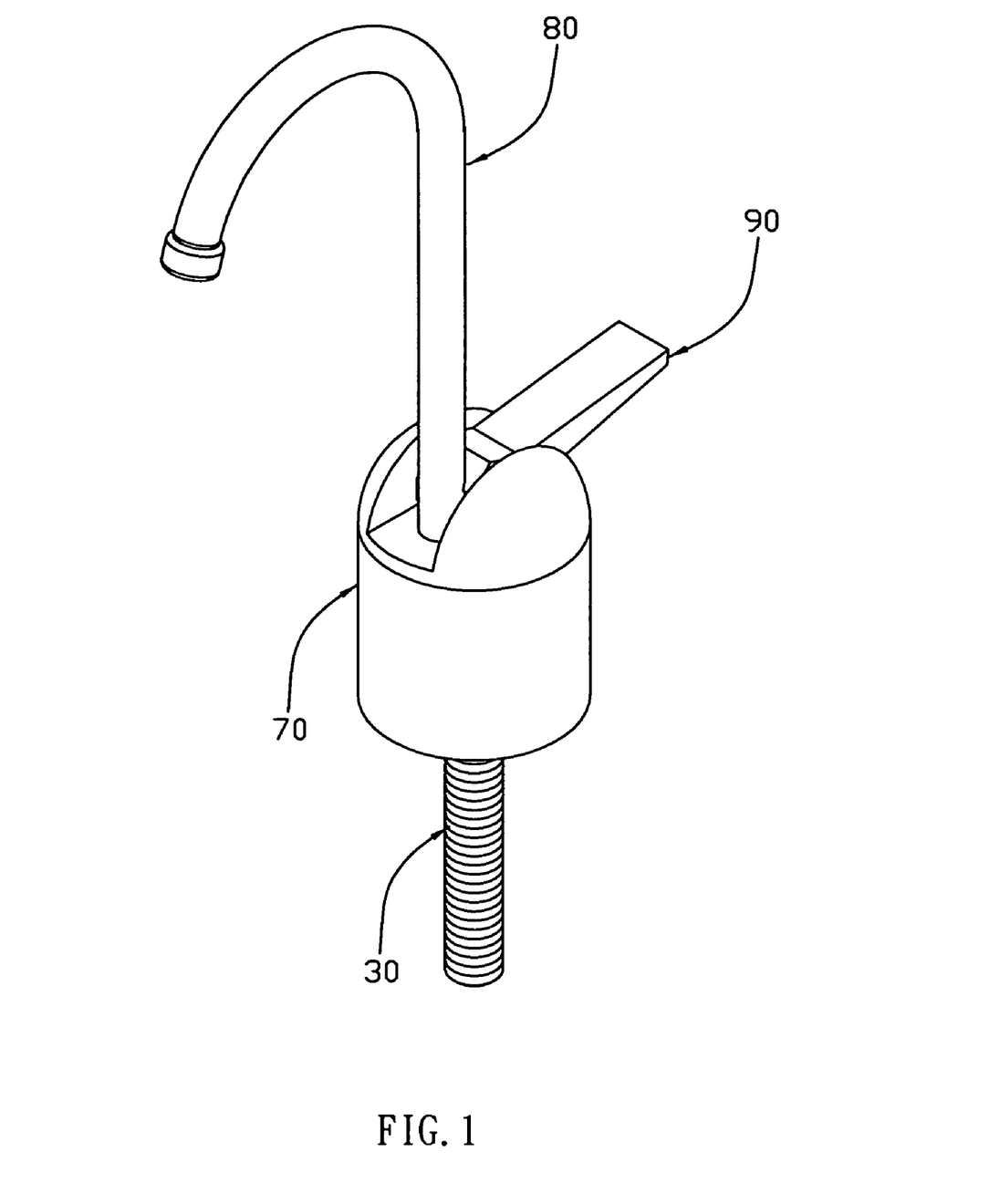
FIG. 1 is a perspective view of a control valve for a drinking water fountain in accordance with the preferred embodiment of the present invention.
Figure 2:
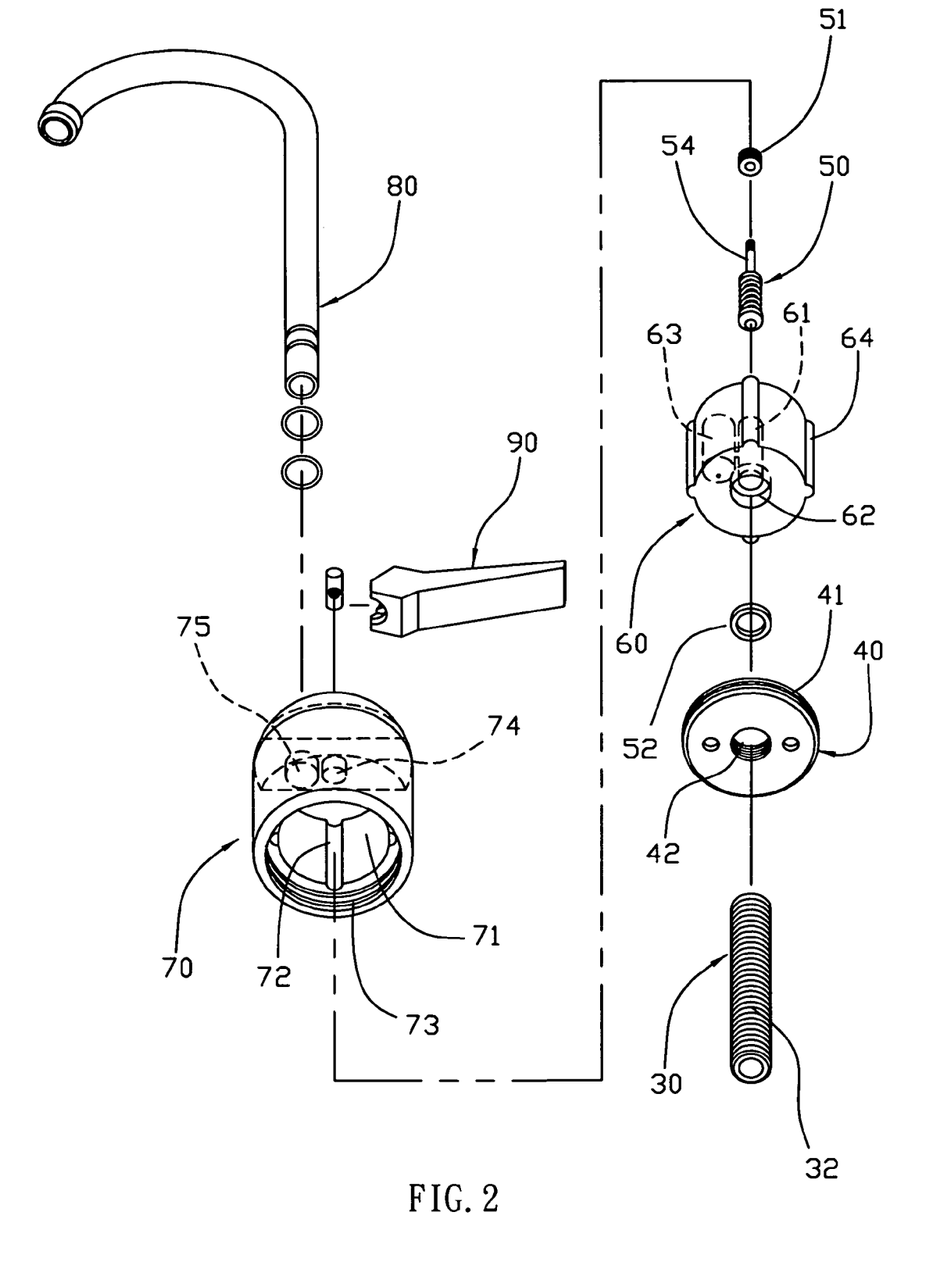
FIG. 2 is an exploded perspective view of the control valve as shown in FIG. 1.
Figure 3:
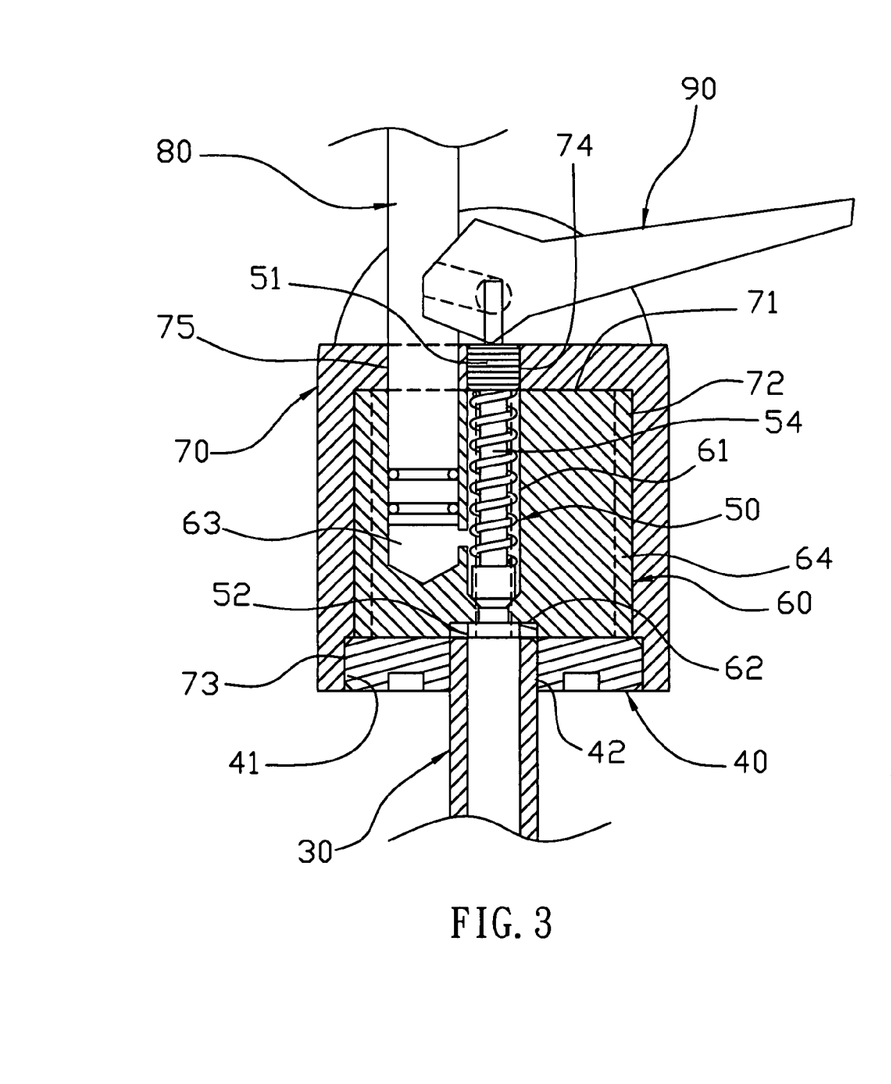
FIG. 3 is a partially side plan cross-sectional view of the control valve as shown in FIG. 1.
Figure 4:
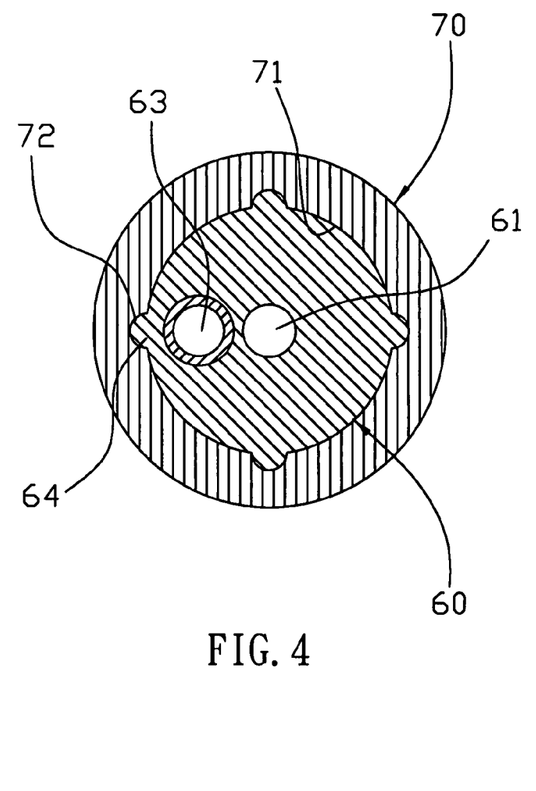
FIG. 4 is a top plan cross-sectional view of the control valve as shown in FIG. 1.
Figure 5:
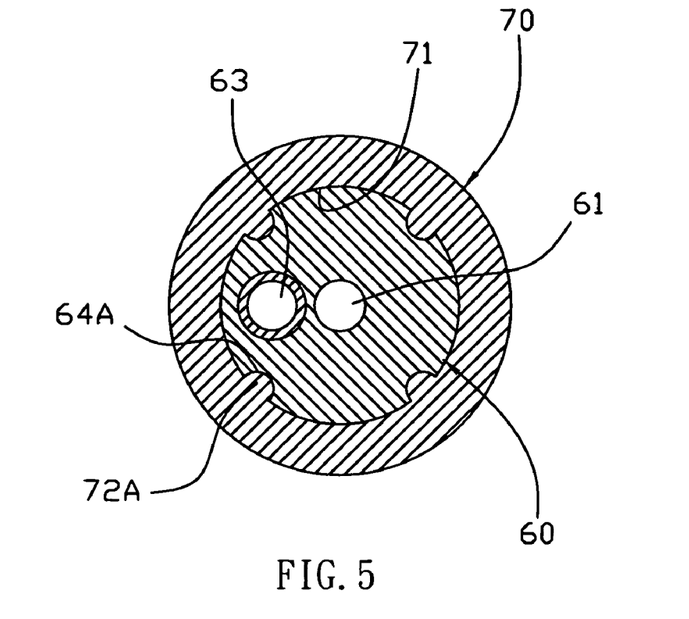
FIG. 5 is a top plan cross-sectional view of a control valve for a drinking water fountain in accordance with another preferred embodiment of the present invention.

Referring to FIG. 5, the valve seat 60 has a periphery formed with a plurality of longitudinally extended arc-shaped locking grooves 64A arranged in a symmetrical manner, and the receiving chamber 71 of the valve housing 70 has a periphery formed with a plurality of longitudinally extended arc-shaped locking ribs 72A arranged in a symmetrical manner and locked in the locking grooves 64A of the valve seat 60 respectively.

Figure 6:
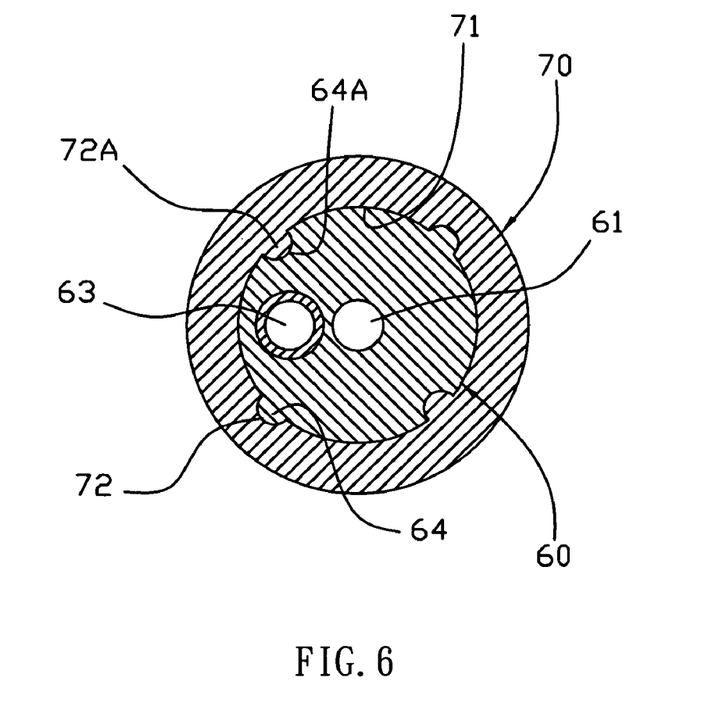
FIG. 6 is a top plan cross-sectional view of a control valve for a drinking water fountain in accordance with another preferred embodiment of the present invention.

Referring to FIG. 6, the receiving chamber 71 of the valve housing 70 has a periphery formed with a plurality of longitudinally extended arc-shaped locking grooves 72 and a plurality of longitudinally extended arc-shaped locking ribs 72A, and the valve seat 60 has a periphery formed with a plurality of longitudinally extended arc-shaped locking ribs 64 locked in the locking grooves 72 of the valve housing 70 respectively and a plurality of longitudinally extended arc-shaped locking grooves 64A for locking the locking ribs 72A of the valve housing 70 respectively. The locking grooves 72 and the locking ribs 72A of the valve housing 70 are arranged in a staggered manner, and the locking ribs 64 and the locking grooves 64A of the valve seat 60 are arranged in a staggered manner.

Figure 7:
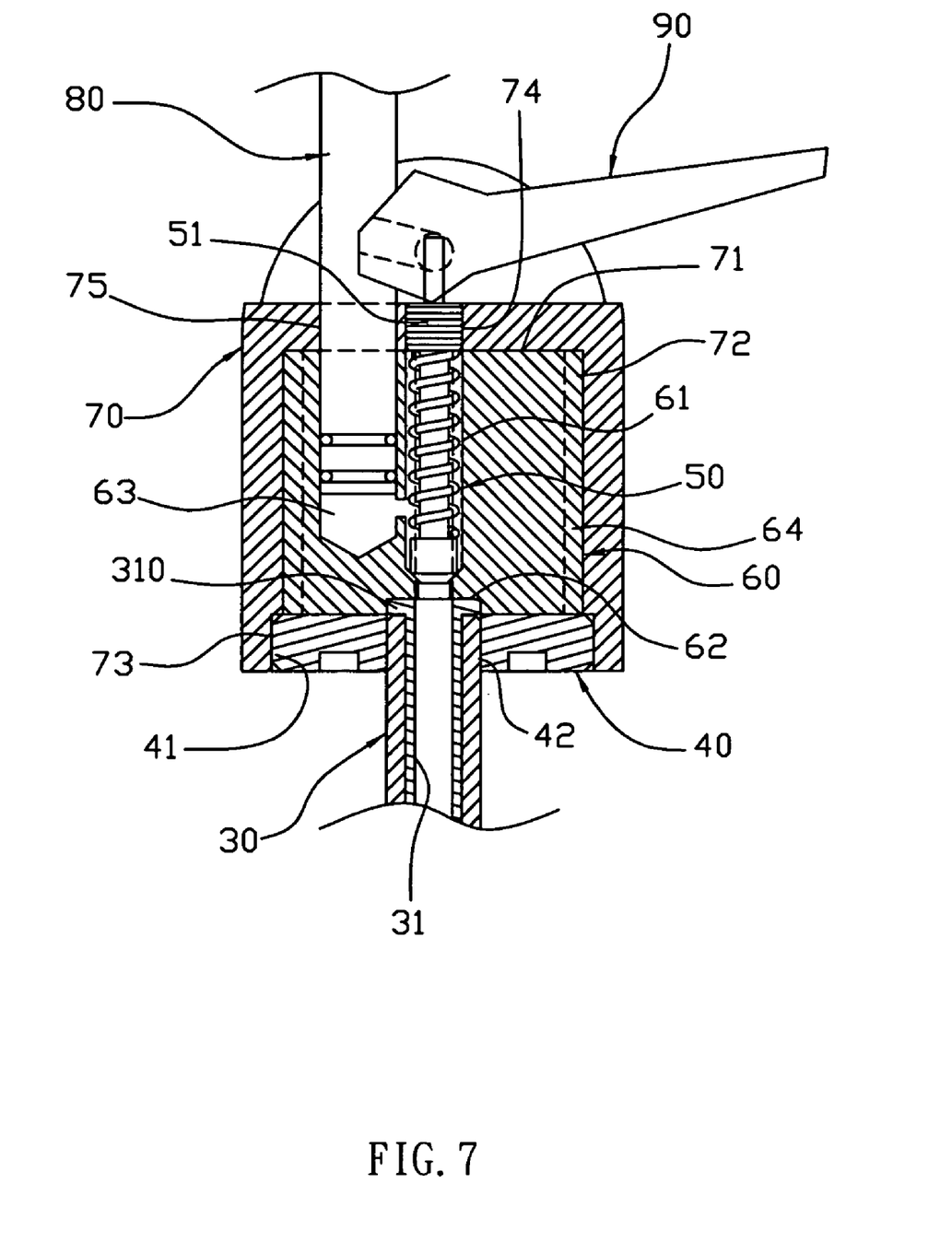
FIG. 7 is a partially side plan cross-sectional view of a control valve for a drinking water fountain in accordance with another preferred embodiment of the present invention.
Figure 7A:
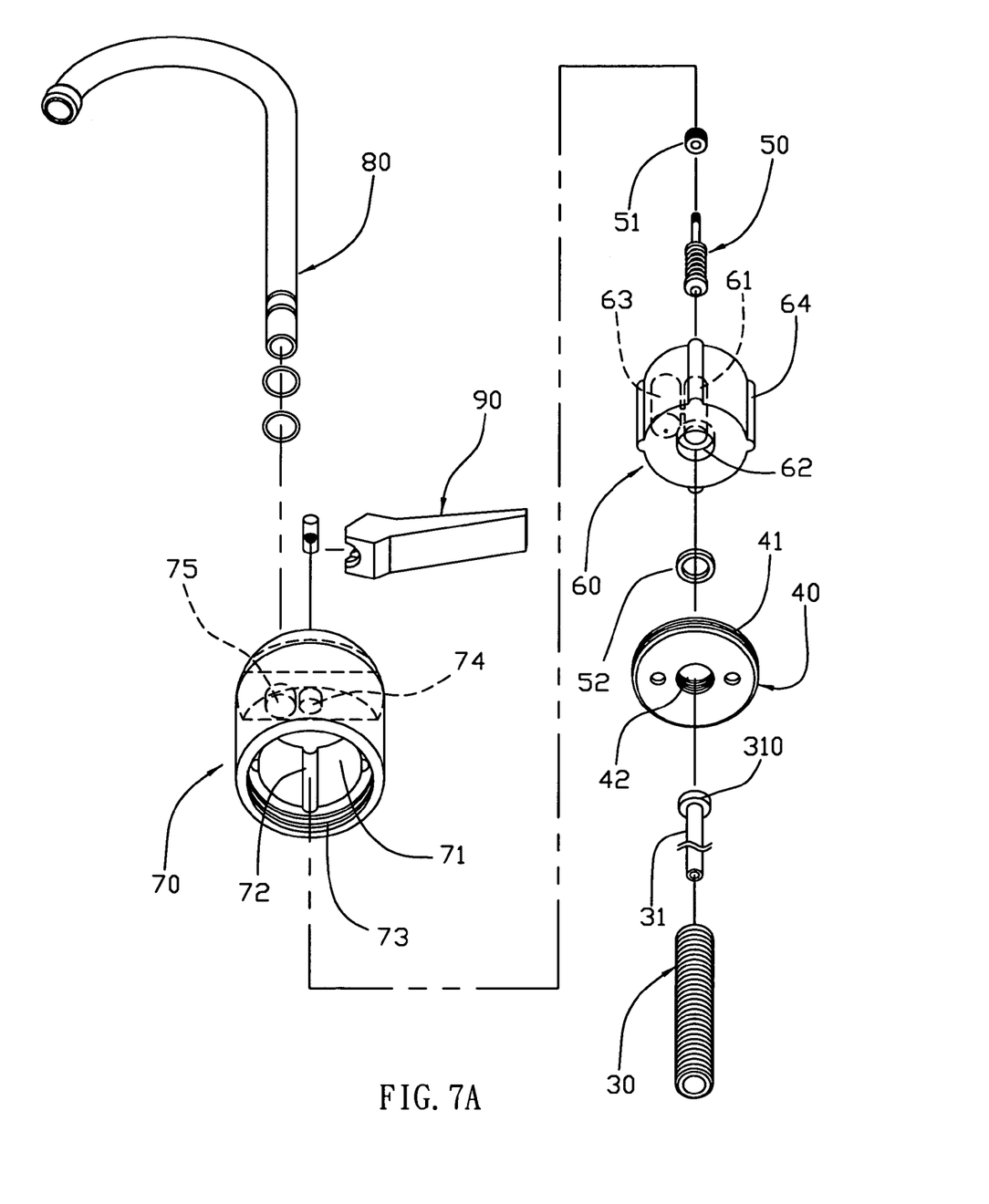
FIG. 7A is a partially exploded perspective view of the control valve as shown in FIG. 7.

Referring to FIGS. 7 and 7A, an inner sleeve 31 is mounted in the water inlet pipe 30 and having an end portion formed with an enlarged head 310 mounted in the stepped hole 62 of the valve seat 60 and rested on the first end of the water inlet pipe 30.

Figure 8:
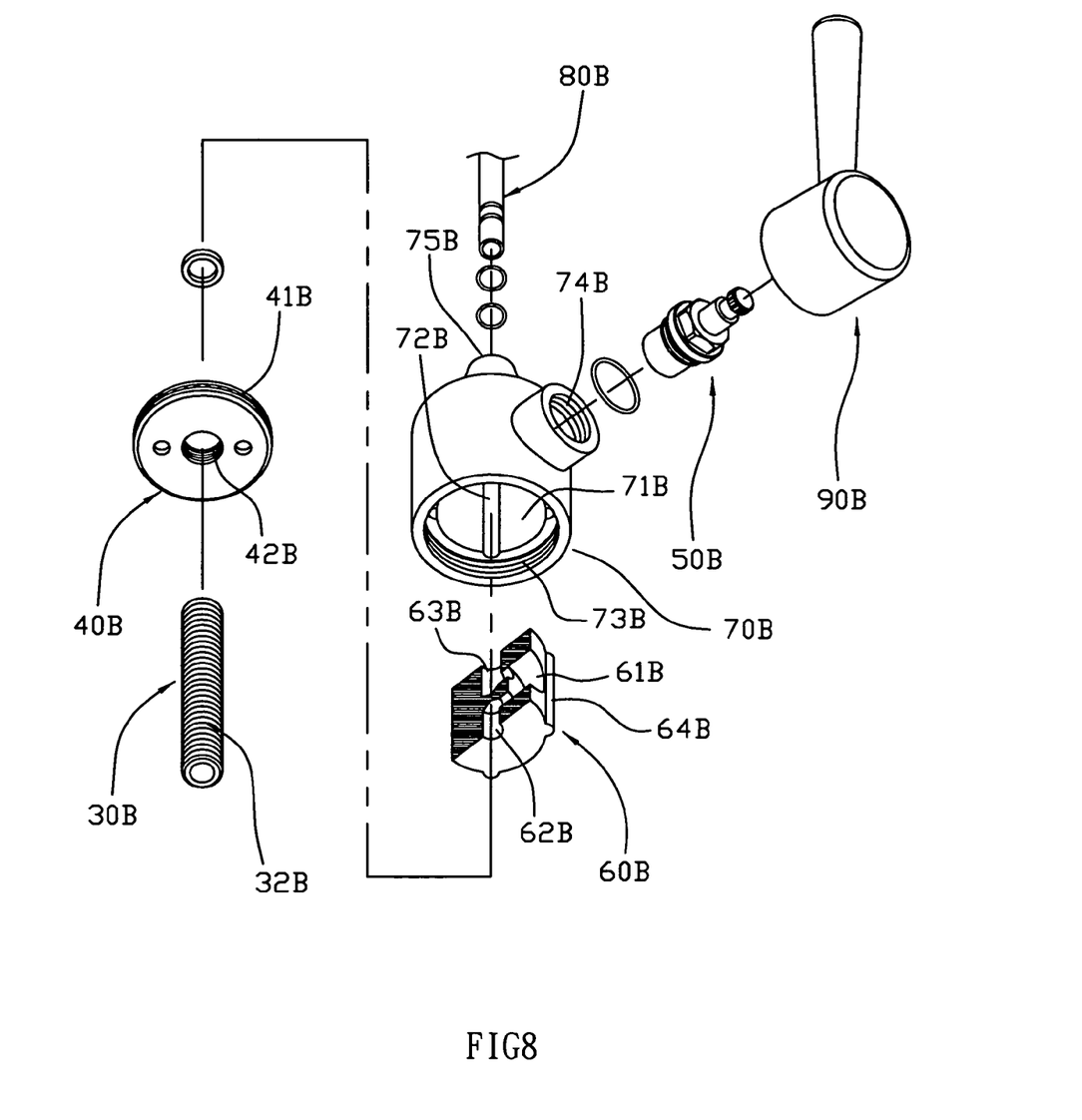
FIG. 8 is an exploded perspective view of a control valve for a drinking water fountain in accordance with another preferred embodiment of the present invention.
Figure 9:
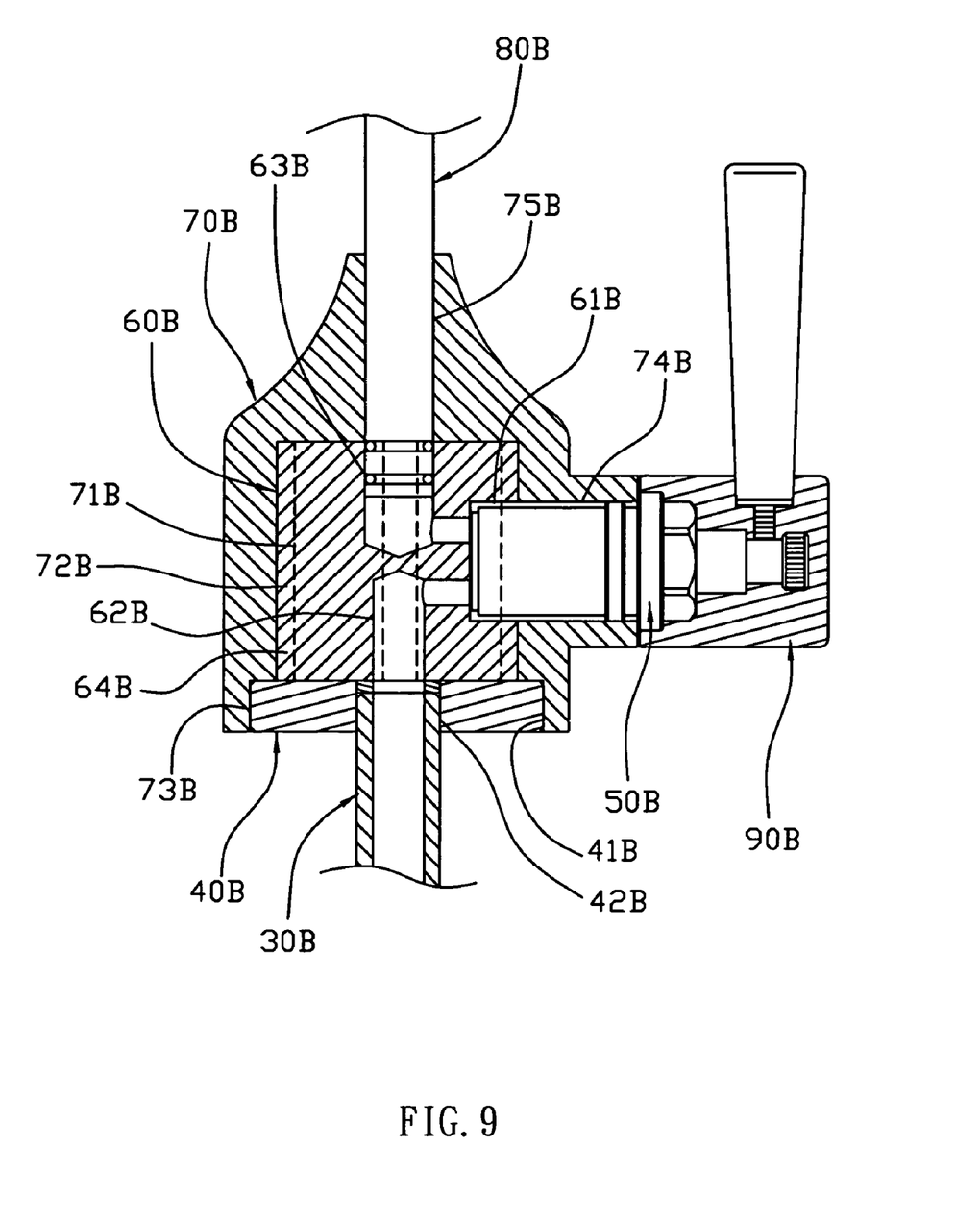
FIG. 9 is a partially side plan cross-sectional assembly view of the control valve as shown in FIG. 8.

Referring to FIGS. 8 and 9, a control valve for a drinking water fountain in accordance with another preferred embodiment of the present invention comprises a water inlet pipe 30B, a locking ring 40B, a control switch 50B, a valve seat 60B, a valve housing 70B, a water outlet pipe 80B, and a handle 90B.

The valve housing 70B has an inside formed with a receiving chamber 71B. The valve housing 70B has an open first end formed with an inner threaded portion 73B and a closed second end formed with an insertion hole 75B connected to the receiving chamber 71B. The valve housing 70B has a side formed with a threaded locking hole 74B connected to the receiving chamber 71B.

The valve seat 60B is a substantially cylindrical body formed by a plastic injection molding process. The valve seat 60B is mounted in the receiving chamber 71B of the valve housing 70B and has a side formed with a valve chamber 61B connected to the locking hole 74B of the valve housing 70B. The valve seat 60B has a first end formed with a water inlet hole 62B connected to the valve chamber 61B and a second end formed with a water outlet hole 63B connected to the valve chamber 61B and the insertion hole 75B of the valve housing 70B.

The locking ring 40B is secured on the first end of the valve housing 70B and rested on the valve seat 60B to retain the valve seat 60B in the receiving chamber 71B of the valve housing 70B. The locking ring 40B has a periphery formed with an outer threaded portion 41B screwed into the inner threaded portion 73B of the valve housing 70B and an inside formed with a threaded locking hole 42B.

The water inlet pipe 30B has a first end extended through the locking ring 40B and connected to the water inlet hole 62B of the valve seat 60B and a second end connected to a water filtering device (not shown). The water inlet pipe 30B has a periphery formed with an outer threaded portion 32B screwed into the locking hole 42B of the locking ring 40B.

The water outlet pipe 80B is mounted on the valve housing 70B and connected to the valve seat 60B. The water outlet pipe 80B has a lower end inserted into the insertion hole 75B of the valve housing 70B and the water outlet hole 63B of the valve seat 60B so that the water outlet pipe 80B is connected to the water hole 63B of the valve seat 60B.

The control switch 50B is mounted between the valve housing 70B and the valve seat 60B. The control switch 50B is mounted in the locking hole 74B of the valve housing 70B and connected to the valve chamber 61B of the valve seat 60B to control a water flow of the water inlet hole 62B and the water outlet hole 63B of the valve seat 60B.

The handle 90B is rotatably mounted on the valve housing 70B and connected to the control switch 50B to control operation of the control switch SOB.

In operation, the water from the water inlet pipe 30B in turn flows through the water inlet hole 62B, the valve chamber 61B and the water outlet hole 63B of the valve seat 60B and the water outlet pipe 80B and is injected outward from the water outlet pipe 80B for use with a user. At this time, the control switch 50B is operated by the handle 90B to open or close connection between the water inlet pipe 30B and the water outlet pipe 80B.

In the preferred embodiment of the present invention, the valve seat 60B is forced into the receiving chamber 71B of the valve housing 70B by a rib and groove engagement so that the valve seat 60B is closely secured in the receiving chamber 71B of the valve housing 70B and cannot be rotated relative to the valve housing 70B. Preferably, the receiving chamber 71B of the valve housing 70B has a periphery formed with a plurality of longitudinally extended arc-shaped locking grooves 72B arranged in a symmetrical manner, and the valve seat 60B has a periphery formed with a plurality of longitudinally extended arc-shaped locking ribs 64B arranged in a symmetrical manner and locked in the locking grooves 72B of the valve housing 70B respectively.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A control valve, comprising:
    a valve housing having an inside formed with a receiving chamber;
    a valve seat mounted in the receiving chamber of the valve housing; wherein:
    the valve seat is forced into the receiving chamber of the valve housing by a rib and groove engagement so that the valve seat is secured in the receiving chamber of the valve housing;
    the receiving chamber of the valve housing has a periphery formed with a plurality of longitudinally extended locking grooves, and the valve seat has a periphery formed with a plurality of longitudinally extended locking ribs forced into and locked in the locking grooves of the valve housing respectively;
    the valve seat is a substantially cylindrical body formed by a plastic injection molding process;
    each of the locking ribs of the valve seat has a shape and a size matching that of a respective locking groove of the valve housing;
    each of the locking ribs of the valve seat is forced into the respective locking groove of the valve housing without producing a gap between each of the locking ribs of the valve seat and the respective locking groove of the valve housing to prevent vibration from producing between the valve seat and the valve housing;
    the valve housing has an open first end formed with an inner threaded portion having a stepped shape and a closed second end formed with a threaded locking hole and an insertion hole each connected to the receiving chamber;
    the valve seat has a central portion formed with a valve chamber having a first end formed with a stepped hole and a second end connected to the locking hole of the valve housing and has a side formed with a water outlet port connected to the valve chamber and the insertion hole of the valve housing.

2. The control valve in accordance with claim 1, wherein each of the locking grooves of the valve housing is substantially arc-shaped.

3. The control valve in accordance with claim 1, wherein the locking grooves of the valve housing are arranged in a radially symmetrical manner.

4. The control valve in accordance with claim 1, wherein each of the locking ribs of the valve seat is substantially arc-shaped.

5. The control valve in accordance with claim 1, wherein the locking ribs of the valve seat are arranged in a radially symmetrical manner.

6. The control valve in accordance with claim 1, further comprising an O-ring mounted in the stepped hole of the valve seat and rested on an end of a water inlet pipe.

7. The control valve in accordance with claim 1, further comprising an inner sleeve mounted in the water inlet pipe and having an end portion formed with an enlarged head mounted in the stepped hole of the valve seat and rested on an end of a water inlet pipe.

8. The control valve in accordance with claim 1, wherein each of the locking grooves of the valve housing extends into a peripheral wall of the valve housing through a determined extent and does not extend through a whole thickness of the peripheral wall of the valve housing.

* * * * *